Figure 1:
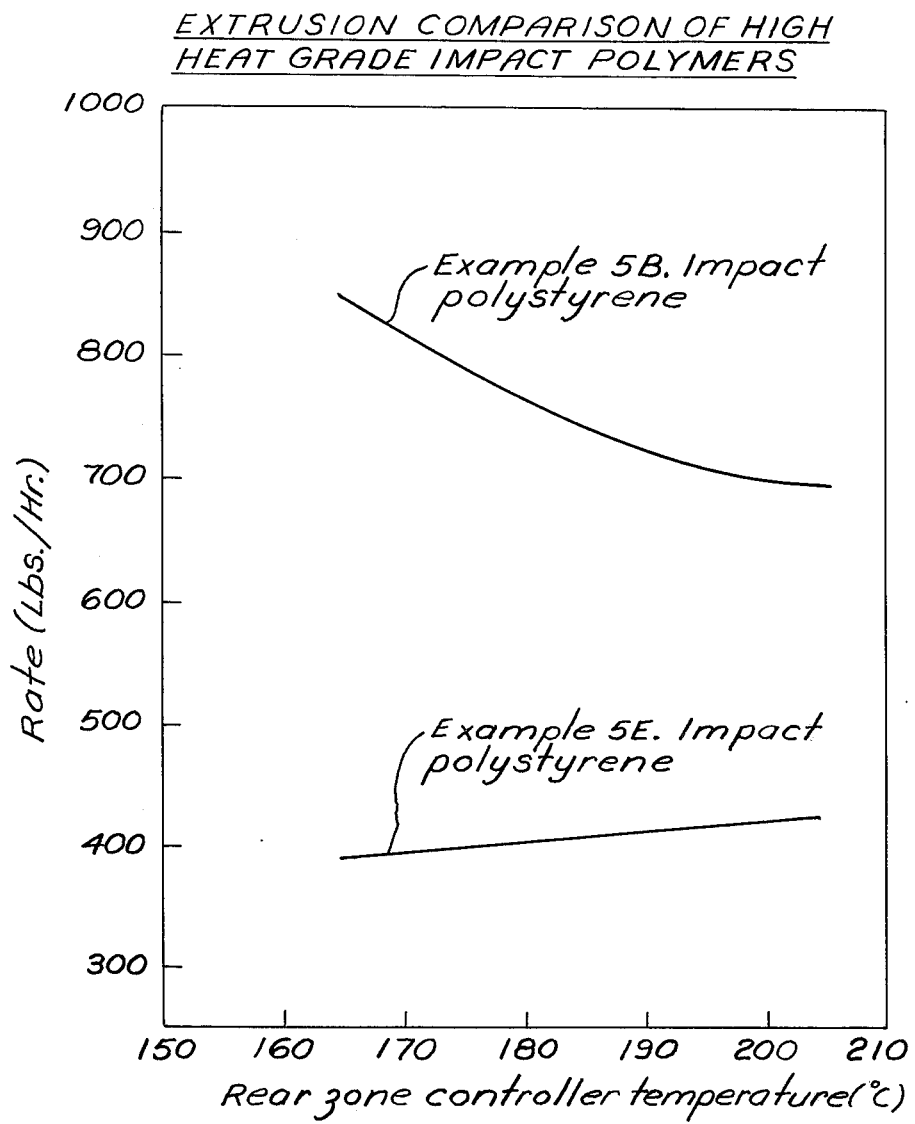

United States Patent [19]
Davies et al.

[11] 3,929,936
[45] Dec. 30, 1975

[54] POLYSTYRENE

[75] Inventors: Thomas Ellis Davies, Barry; Hubert Brian Hopkins, Swansea, both of Wales

[73] Assignee: The Dow Chemical Company, Midland, Mich.

[22] Filed: Apr. 16, 1973

[21] Appl. No.: 351,712

Related U.S. Application Data

[63] Continuation-in-part of Ser. No. 89,938, Feb. 17, 1961, abandoned, said Ser. No. 651,660.

[30] Foreign Application Priority Data
Feb. 27, 1960 United Kingdom.............. 6955/60

[52] U.S. Cl............... 260/892; 260/880 B; 260/893
[51] Int. Cl.²........................................... C08L 9/06

[58] Field of Search............ 260/880 R, 880 B, 881, 260/892, 893

[56] References Cited
UNITED STATES PATENTS
3,264,374  8/1966  Jones............................. 260/880 B FOREIGN PATENTS OR APPLICATIONS
852,823  10/1960  United Kingdom............. 260/880 B Primary Examiner—Murray Tillman
Assistant Examiner—J. Ziegler
Attorney, Agent, or Firm—Bernd W. Sandt

[57] ABSTRACT

Improved impact polystyrenes are obtained when styrene is polymerized with a cis-butadiene styrene copolymer rubber as the toughening agent.

6 Claims, 1 Drawing Figure

POLYSTYRENE

CROSS REFERENCE TO RELATED APPLICATION

The present application is a continuation-in-part of our application Ser. No. 89,938 filed on Feb. 17, 1961, now abandoned, and application Ser. No. 651,660 filed July 7, 1967, now abandoned.

BACKGROUND OF THE INVENTION

The present invention relates to toughened styrene polymers, as herein defined. By a toughened polymer is meant a composition consisting primarily of said polymer in an unmodified form but which contains a minor proportion of a toughening agent, the presence of which gives the resultant composition greater toughness, i.e. it possesses greater impact strength and/or a higher maximum elongation before breaking under tension and/or a greater flexibility than the pure polymer.

Such toughened polymers should be distinguished from the materials commonly known as graft copolymers. The latter are made by polymerizing a monomeric material in the presence of a polymeric material under such conditions that substantially all the polymerizing monomeric material becomes chemically attached to the polymeric material. Graft copolymers consist essentially of molecules of substantially identical chemical composition. By contrast toughened styrene polymers are two phase systems which are produced by polymerizing a solution of a rubber in styrene under well known conditions. The polymerization is brought about by a free radical mechanism which is initiated thermally and/or by the addition of a free radical producing initiator. During the polymerization a very minor proportion of the polymerizing styrene becomes chemically attached to the rubber. The resultant grafted rubber molecules, which become cross-linked, form a separate phase of discrete rubbery particles dispersed in a matrix of styrene polymer. The size and distribution of the particles affect the properties of the overall polymer.

SUMMARY OF THE INVENTION

The present invention is particularly concerned with toughened styrene polymers having improved physical properties.

Accordingly the present invention is a composition comprising a major proportion of a styrene polymer, as herein defined, and as toughening agent a minor proportion of a high cis-1,4-butadiene/styrene polymer, as herein defined.

By "styrene polymer" is meant any solid homopolymer or copolymer of styrene or a nuclear methyl substituted styrene having a softening point not less than 70°C, said softening point being measured according to British Standard 2782, part 1, method 102C. A preferred styrene polymer is polystyrene. Suitable copolymers can be obtained by copolymerizing styrene with other vinyl aromatic compounds such as ortho-, meta- or para-methyl styrene and 2,4-dichlorostyrene, or with comonomers which are not vinyl aromatic compounds such as acrylonitrile, methyl methacrylate, dimethyl itaconate and alpha-methyl styrene. Valuable compositions may also be derived from copolymers of ortho-, meta- or para-methyl styrene with copolymerizable monomers which are not vinyl aromatic compounds such as acrylonitrile, methyl methacrylate and dimethyl itaconate. In general, the comonomer is employed in a concentration of up to 40 percent by weight of the total monomers. Copolymers comprising approximately 70 parts of styrene with 30 parts of acrylonitrile and approximately 35 parts of styrene with 65 parts of methyl methacrylate and approximately 60 parts of styrene with 40 parts of dimethyl itaconate are well-known, commercially available products which can be used to form compositions according to the present invention.

The high cis-butadiene toughening agents employed in the present invention contain from 50 to 95 percent of polymerized butadiene units, in which between 30 to 95 percent of these units have the formula

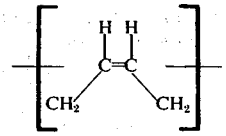

and in which the stereo configuration about the double bond is "cis."

Particularly useful toughened polymers are obtained using butadiene/styrene copolymer rubbers which contain from 30 to 75 percent of their butadiene units in the cis configuration.

In addition to the cis form, the butadiene units can also assume a trans or vinyl configuration. In general, it is preferred to employ styrene/butadiene copolymers in which less than 15 percent of the butadiene units have a vinyl configuration. Butadiene units having the trans form are relatively inert and account for the remaining butadiene units in the copolymer.

The toughened polystyrene compositions of the present invention exhibit superior physical properties and more particularly exhibit a combination of improved fabricability, improved aesthetic properties on extrusion such as gloss and transparency with improved mechanical properties such as impact strength. The toughened polystyrene compositions of the present invention are superior in gloss, fabricability and transparency to compositions obtained with the high cis-butadiene homopolymers and fully the equal of such in mechanical properties. The copolymer reinforced polystyrenes are also superior to styrene butadiene rubbers heretofore used for the toughening of polystyrene when compared at equal butadiene contents.

The cis-butadiene/styrene rubber toughening agents employed in the present invention are obtained by the copolymerization of styrene and butadiene using such catalysts as Ziegler catalysts or alkyl lithium catalysts as described in U.S. Pat. No. 3,317,918. Conventional emulsion polymerization systems do not give rise to cis-butadiene/styrene copolymers as defined above.

The proportion of the polymerized butadiene units in a butadiene polymer which have the cis-1,4-structure is readily determined by infrared spectroscopy.

The compositions according to the present invention can be prepared by polymerizing or copolymerizing styrene or a nuclear methyl substituted styrene in the presence of the cis-1,4-butadiene/styrene copolymer. The polymerization can be carried out in a homogeneous system by dissolving the butadiene polymer in the monomer or mixture of monomers and then allowing the solution to polymerize or copolymerize using any of the techniques that are well known for the production of rubber reinforced styrene polymers. If desired an inert solvent can be present to aid the formation of a homogeneous polymerization mixture.

The quantity of the high cis-1,4-butadiene polymer present in compositions according to the present invention can be varied widely provided that the styrene polymer remains a major component by weight of the composition and the high cis-1,4-butadiene polymer remains a minor component by weight. Most suitably the cis-1,4-butadiene/styrene copolymer amounts to 1 to 20 percent by weight of the total polymer. The preferred compositions contain 1 to 10 percent by weight of the cis-1,4-butadiene/styrene copolymer.

DESCRIPTION OF SOME PREFERRED EMBODIMENTS

Compositions according to the present invention may contain any of the additives normally present in compositions based on styrene polymers. Such additives are for example, plasticisers, lubricants, antioxidants, colouring materials, inert fillers and, if desired, other toughening agents. The following examples illustrate the preparation and properties of compositions according to the present invention.

EXAMPLE 1

To monomeric styrene was added 11.8 percent of its weight of a cis-butadiene/styrene copolymer rubber (Philprene X-40) in which about 45 percent of the butadiene units had a cis configuration, about 9 percent a vinyl configuration, the remainder of the butadiene units having a trans configuration. After several hours stirring at room temperature to effect solution of the rubber, the mixture was allowed to polymerize whilst being stirred at 112°C for 6 hours. The viscous, partly polymerized mixture was then transferred to a vessel which was sealed by means of a screw-top and subjected to the following heating schedule in a thermostatically-controlled oven to complete the polymerization: 48 hours at 115°C, 24 hours at 150°C, 3 hours at 200°C.

The resultant toughened polystyrene was compression moulded into thin sheets and heated in a vacuum oven at a pressure of 4mm of mercury for 2 hours at 150°C, to remove any unreacted monomer. The material was then compression moulded into test specimens suitable for the determination of its physical properties. By way of comparison, the whole experiment was repeated using, in place of the styrene-butadiene copolymer of high cis-1,4-content, a styrene-butadiene copolymer produced by a conventional emulsion process. In this copolymer less than 30 percent of the butadiene units were 1,4 units with cis configuration.

The Charpy impact strength of the polymer toughened by the styrene-butadiene copolymer of high cis-1,4 content was $20 \times 10^6$ ergs/cm$^2$, in contrast to the value of $16 \times 10^6$ ergs/cm$^2$ obtained for the other toughened polymer.

EXAMPLE 2

To 950 g of styrene monomer was added 50 g of a butadiene-styrene copolymer ("Duradene") having the following structure:
bound styrene 25%; butadiene portion cis-1,4 45%; trans-1,4 47%; vinyl 8%. Mineral oil (25 g), alphamethyl styrene dimer (1.3 g) and di-tertiary butyl peroxide (0.3 g) were added to the solution of the rubber in styrene. The polymerization was carried out in a vessel of approximate 4.5 l capacity, equipped with an off-centre stirrer shaft. A three-bladed upthrust impeller was fitted to the bottom of the shaft and a similar downthrust impeller was located 8.9 cm above the lower impeller. The above solution was charged to the vessel together with 1000 g of distilled water. The vessel was closed, flushed with nitrogen and pressurized with nitrogen to 20 psi. The contents of the vessel were agitated at a speed of 100 rpm at a temperature of 115°C for 2.5 hours. A solution of polyvinyl alcohol (3.5 g; "Moviol N70-88," manufactured by Farbwerke Hoechst, Germany) and dihexyl sodium sulphosuccinate (0.2 g; "Manoxol MA," manufactured by Hardman & Holden Ltd., England) in 1000g of distilled water was then injected into the vessel to form a stable suspension. Polymerization was completed according to the following schedule;

| Time, hours | 0.5 | 0.5 | 1.5 | 0.5 | 0.5 | 4 |
|---|---|---|---|---|---|---|
| Temperature, °C | 115 | 125 | 130 | 135 | 145 | 155 |
| Agitator speed, rpm | 300 | 600 | 600 | 600 | 600 | 600 |

The beads of polymer obtained on cooling and filtering the reaction mixture were washed with water and dried. The beads were then blended with 0.5 percent by weight of 2,6-di-tertiary butyl 4-methyl phenol and pelletized by extrusion.

The properties of this polymer are shown in the following table in comparison with those of a polymer prepared under similar conditions but employing a butadiene-styrene copolymer rubber of the prior art as reinforcing agent. The particular rubber used was "Intol 1006," manufactured by the International Synthetic Rubber Co. in Great Britain. The rubber contains 23.5 percent of bound styrene. Less than 20 percent of the bound butadiene units possess the cis-1,4 configuration.

| Test | Unit | Rubber Duradene | Intol 1006 |
|---|---|---|---|
| Volatile content | % | 2.2 | 2.3 |
| Elongation at break | % | 39 | 29 |
| Tensile strength | p.s.i. | 4400 | 4450 |
| Izod impact strength | ft/lb/in notch | 1.60 | 1.51 |

The superior toughening action of the cis butadiene-styrene copolymer rubber is apparent from the higher elongation and impact strength values of the polymer incorporating the "Duradene" rubber.

EXAMPLE 3

To 920 g of styrene monomer was added 80 g of butadiene-styrene copolymer rubber ("Unidene Solution SBR"). The structure of this rubber was as follows:
bound styrene 7.3%; butadiene portion: cis 1,4, 49.7%; trans 1,4, 41.8%; vinyl 8.5%. After stirring at room temperature to effect solution of the rubber, 20 g of mineral oil, 1 g of alpha-methyl styrene dimer and 0.3 g of di-tertiary butyl peroxide were added. The solution was charged to a 1400 ml cylindrical glass vessel which was equipped with an agitator and a thermometer. The agitator consisted of a vertical stainless steel shaft of approximate diameter 0.6 cm fitted with 7 horizontal rods of diameter 0.6 cm and length 7.5 cm at a separation of 2 cm. The glass vessel was immersed in an oil bath. The contents of the vessel were stirred at a temperature of 112°C and an agitator speed of 50 revolutions per minute until approximately 29 percent of the monomer had polymerized. The partly polymerized solution was then added to a solution of 3.5 g polyvinyl alcohol (Moviol N 70-88, manufactured by Farbwerke Hoechst in Germany) and 0.2 g dihexyl sodium sulphosuccinate (Manoxol MA, manufactured by Hardman and Holden Ltd. in Great Britain) in 2000 g of distilled water. This solution was placed in a 4.5 l stainless steel polymerization vessel equipped with a two-bladed off-centre agitator. The mixture was agitated at 600 revolutions per minute while the following temperature schedule was applied:

| Time, hours | 0.5 | 0.5 | 1.5 | 0.5 | 0.5 | 4 |
|---|---|---|---|---|---|---|
| Temperature, °C | 110 | 125 | 130 | 135 | 145 | 155 |

The beads of polymer obtained on cooling and filtering the reaction mixture were washed and dried. The beads were finally heated at 155°C under a vacuum of 4 mm of mercury for 30 minutes to remove unreacted monomer.

By way of comparison, the whole experiment was repeated using, in place of the butadiene-styrene copolymer rubber of 49.7% cis-1,4 content, a butadiene-styrene copolymer rubber ("Synpol 8107E") in which the cis-1,4 content of the butadiene portion was only 8%. The bound styrene content of the rubber was 5.5%.

The properties of the two polymers are shown in the following table:

| PROPERTY | TEST METHOD | UNIT | cis-1,4 content of butadiene portion % | |
|---|---|---|---|---|
| | | | 49.7 | 8.0 |
| Volatile Content | Loss in weight in 1 hour at 213°C and 1 mm. mercury pressure | % | 1.9 | 2.2 |
| Tensile Strength | B.S. 2782, Method 301J. | psi | 4150 | 4170 |
| Elongation at break | B.S. 2782, Method 301J. | % | 43 | 17 |
| Izod Impact Strength | B.S. 3126, Appendix A. | ft/lb/in notch | 2.0 | 1.8 |

B.S. refers to British Standard Specification

The significantly superior elongation-at-break and Izod impact strength values achieved by the use of the butadiene-styrene copolymer rubber of "high-cis" content will be noted.

EXAMPLE 4

To 732 g of styrene monomer was added 85 g of the butadiene-styrene copolymer rubber (Duradene) used in Example 2. After stirring at room temperature to effect solution of the rubber, 180 g of acrylonitrile comonomer, 10 g of mineral oil and 2.5 g of lauroyl peroxide were added. The mixture was polymerized at a temperature of 63°C in a cylindrical glass vessel as described in Example 1.

When 29 percent of the monomer mixture had polymerized, 2 g of 2,2-methylenebis(6-tertiary butyl-4-methyl phenol) and 0.6 g of di-tertiary butylperoxide were added. The polymerization was then completed in aqueous suspension, as described in Example 1 but according to the followng schedule:

| Time, hours | 1 | 1.5 | 1.5 | 1 | 1 | 1 | 0.5 | 0.5 | 2 |
|---|---|---|---|---|---|---|---|---|---|
| Temp., °C | 105 | 110 | 115 | 120 | 125 | 130 | 135 | 145 | 155 |

The properties of the polymer obtained were as follows:

| PROPERTY | TEST METHOD | UNIT | VALUE |
|---|---|---|---|
| Volatile Content | Loss in weight in 1 hour at 213°C and 1 mm mercury pressure | % | 2.2 |
| Softening Point | B.S. 2782 Method 102C | °C | 9.5 |
| Tensile Strength | B.S. 2782 Method 301J | psi | 5930 |
| Elongation | B.S. 2782 Method 301J | % | 33 |
| Izod impact strength | B.S. 3126, Appendix A. | ft/lb/in notch | 2.8 |

These figures show that a high quality product was produced.

An attempt was made to repeat the whole experiment using, in place of the Duradene, a butadiene-styrene copolymer rubber ("Intol 1509") of the prior art prepared by emulsion polymerization. The cis-1,4 content of the butadiene portion was only 8 percent. The polymer thus obtained was found to be present in the form of large, irregularly shaped particles and as a thick coating on the walls of the polymerization vessel. No suitable material was obtained for testing.

This experiment confirmed earlier observations that the achievement of a stable suspension was more difficult when using a butadiene-styrene copolymer rubber of the prior art than when using a butadiene-styrene copolymer rubber of "cis" content in the range 30 to 100 percent of the polymerized butadiene content of the copolymer.

EXAMPLE 5

A. Emulsion Butadiene Styrene Rubber Toughened Polystyrene

An emulsion copolymerized rubbery copolymer commercially available and known as SBR 1006 and containing 23 weight percent bound styrene and 77 weight percent butadiene of which the cis content is 18 percent, the trans content 60 percent and the vinyl content 22 percent was employed in this example. This rubbery copolymer (7.5 wt. %) was incorporated in styrene monomer (92.5 wt. %) and polymerized substantially by the procedure set forth in Example 8 of U.S. Pat. No. 3,243,481 except that 1.3 percent of mineral oil was employed. The final product contained 5.8 percent of chemically combined butadiene, corresponding to 7.5 weight percent of the SBR 1006 rubber.

B. Cis Butadiene-styrene Rubber Toughened Polystyrene

Nine parts by weight of a rubbery copolymer obtained from the Phillips Petroleum Co. was incorporated in 91 parts by weight of styrene monomer and polymerized substantially by the procedure of Example 8 of U.S. Pat. No. 3,243,481 except that no mineral oil was employed. The rubbery copolymer is obtained by polymerization in the presence of an alkyl lithium catalyst and contains 40 weight percent styrene and 60 weight percent butadiene. The cis content of the butadiene portion was 35 percent, the trans content was 56 percent, and the vinyl content was 9 percent. The product contained 5.4 percent of chemically combined butadiene, corresponding to 9 percent of the rubbery copolymer.

C. Cis Butadiene-styrene Rubber Toughened Polystyrene

Using the foregoing procedure 5 percent by weight of the copolymer was copolymerized with 95 percent of styrene.

Compression moulded samples were prepared from Polymers A, B and C and individually tested under identical conditions. The gloss of the moulded samples was measured using the Hunter Distinctness of Image method. The following results were obtained:

| PRODUCT | A | B | C |
|---|---|---|---|
| % Butadiene | 5.4 | 5.4 | 3 |
| Cis-1,4 content of butadiene portion | 18.0 | 35 | 35 |
| Tensile Strength in psi | 2650 | 3600 | 4500 |
| Elongation in % | 35 | 20 | 15 |
| Flexural Strength in psi | 5690 | 7470 | — |
| Izod Impact Strength in ft/lbs | 1.25 | 1.25 | 0.82 |
| Dart Impact Strength | 11.5 | 15.3 | 4.7 |
| Heat Distortion Temperature in °F | 206° | 220° | 221° |
| Gloss (Peak) in % | 9 | 43 | 55 |
| Gloss (Slope) in % | 34 | 73 | 83 |

The foregoing comparison shows the superior mechanical properties obtained with cis butadiene-styrene rubbers as compared to emulsion polymerized styrene-butadiene rubbers. In particular the improved gloss and tensile strength of the product makes the cis copolymer rubber toughened polystyrenes valuable in many applications such as toys, handles for utilities, radio and television cabinets and refrigerator door levers.

D. Cis-Polybutadiene Toughened Polystyrene

Using substantially the procedure of Example 8 of U.S. Pat. No. 3,243,481, 9 parts of a polybutadiene available from Firestone Synthetic Rubber and Latex Company, as "Diene 35," consisting of about 35 percent cis-1,4, about 55 percent trans-1,4 and about 10 percent vinyl-1,2 butadiene units was incorporated into 91 parts styrene monomer and polymerized using 2.5 parts of mineral oil.

E. Cis-Polybutadiene Toughened Polystyrene

Using the procedure of Example 8 in U.S. Pat. No. 3,243,481, 5.5 parts of "Diene" rubber similar to that employed in Example 5D was polymerized with 94.5 parts of styrene monomer.

Test pieces were moulded from the polymeric products prepared using a procedure similar to that employed in B and C. The test pieces were used to determine properties of the polymeric products. The products had properties as follows:

| EXAMPLE | C | D | E |
|---|---|---|---|
| Polybutadiene in % | 0 | 0 | 0 | 5.5 |
| Copolymer of S-B in % | 9 | 5 | 0 | 0 |
| Tensile Strength in psi | 3600 | 4500 | 2000 | 2500 |
| Elongation in % | 20 | 15 | 60 | 40 |
| Izod Impact Strength in ft/lbs | 1.25 | 0.82 | 1.8 | 1.35 |
| Dart Impact Strength | 15 | 4.7 | 23 | 18 |
| Gloss (Peak) in % | 43 | 55 | — | 7 |
| Gloss (Slope) in % | 73 | 83 | — | 40 |

Taking into consideration that only in Polymers B and E the butadiene content is similar, the foregoing data show significant improvement in tensile strength and gloss as being obtained with the cis-copolymer toughened polystyrenes as compared to the polybutadiene toughened polystyrene.

EXAMPLE 6

A. Emulsion Butadiene-styrene Rubber Toughened Styrene Polymer

Using a procedure similar to Example 8 of U.S. Pat. No. 3,243,481, 7.5 parts of the styrene-butadiene rubber of Example 5A was polymerized with 92.5 parts of a monomeric mixture of 17 weight percent acrylonitrile and 83 weight percent styrene.

B. Cis Butadiene-styrene Rubber Toughened Styrene Polymer

Using the same procedure as in A, 7.5 parts of a cis butadiene-styrene rubber containing 30 percent styrene and 70 percent butadiene, 35 percent of the butadiene having a cis-1,4 structure, was polymerized with 92.5 parts of a monomeric mixture of 17 percent acrylonitrile and 83 percent styrene.

Samples of each of the above products were compression moulded at about 150°C and 700 kg/sq. cm to form test bars of ⅛ × ½ inch cross section. These test bars were used to determine the tensile strength, yield point and percent elongation by procedures similar to those described in ASTM D638-49T. Impact strength was determined by procedure similar to that described in ASTM D256-47T. The polymers had the properties:

| | POLYMER A | POLYMER B |
|---|---|---|
| Tensile yield in kg/cm² | 161 | 294 |
| Tensile rupture in kg/cm² | 147 | 280 |
| % Elongation in % | 7.0 | 20.0 |
| Heat Distortion in °C | 93° | 99° |
| Melt Viscosity in poises | 8000 | 7000 |
| Izod Impact kg/m per 2.54 cm notch | 0.138 | 0.165 |
| Gloss (Peak) in % | a | 35.0 |
| Gloss (Slope) in % | a | 60.0 |

"Too poor to be measured

Polymer A and B each contain approximately the same weight of chemically combined butadiene. Markedly improved tensile yield and tensile rupture are exhibited by Polymer B. Peak gloss was 35 percent and slope gloss was 60 percent for Polymer B, while the peaks and slope gloss for Polymer A were too poor to be measured.

EXAMPLE 7

The toughened polystyrene compositions obtained by the procedure of Examples 5B, using cis butadiene-styrene copolymer rubber, and 5E, using the high cis polybutadiene rubber, were formed into sheet by extruding such through a 4.5 inch NRM extruder equipped with a sheet die. The rate of sheet extrusion was measured by cutting off and weighing portions of the extruded sheet at fixed time intervals. The thickness of the sheet was continuously recorded. FIG. 1 shows the maximum extrusion rates which are still producing acceptable product as a function of the rear zone temperature of the extruder for Polymers 5B and 5E. Using the average sheet thickness, the range of sheet thicknesses, the percent surge, reflecting the uniformity of flow of polymer, was calculated. The average thickness for Polymer 5B sheet was 33 mils, the range 30–36 mils, resulting in a surge of 8 percent. The average thickness of the Polymer 5E sheet was 25 mils, the range of thicknesses 18 to 33 mils, and the percent surge 30.6 percent. The foregoing results clearly show the superior fabricability of the impact polystyrenes made with the cis butadiene-styrene copolymer rubbers.

EXAMPLE 8

Phase contrast photomicrographs at 1900X magnification were made using the Polymers produced by the procedures of Example 5A, 5B and 5E. The phase contrast photomicrographs showed substantially spherical rubber particles dispersed in a polystyrene matrix. The size of the particles was measured and the range of the particle sizes established.

| | |
|---|---|
| Styrene-Butadiene Rubber Toughened Polystyrene (Polymer 5A) | 2–8 microns |
| Cis-Polybutadiene Rubber Toughened Polystyrene (Polymer 5E) | 3–7 microns |
| Cis-Styrene-Butadiene Rubber Toughened Polystyrene (Polymer 5B) | 1–2.5 microns |

The smaller particle size of the cis-butadiene/styrene rubber toughened polystyrenes is deemed to be responsible for the improved gloss and transparency observed with these impact polystyrenes but does not explain the retained toughness. Thus, if the particle size of impact polystyrenes made either with GRS type rubbers or with cis-polybutadiene rubbers is reduced to the size of 2 to 2.5 microns, the toughness of the materials is reduced to the point that the polymer would not be acceptable for use as an impact polystyrene.

We claim:

1. A composition comprising a major proportion of a styrene polymer selected from the group consisting of homopolymers and copolymers of styrene and the nuclear methyl substituted styrenes having a softening point greater than 70°C and, as toughening agent, a minor proportion of a copolymer of butadiene and styrene, containing from 50 to 95 percent polymerized butadiene, from 30 to 95 percent of said polymerized butadiene units having the formula

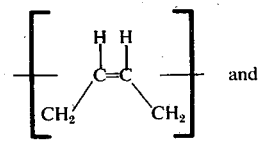

and in which the stereo configuration about the double bond is cis, said toughening agent having been obtained by polymerization with an alkyl lithium catalyst, said composition containing the toughening agent in discrete particulate form, dispersed in a matrix of the styrene polymer.

2. The composition as claimed in claim 1, wherein the styrene polymer is polystyrene.

3. The composition as claimed in claim 1, wherein from 30–75 percent of the polymerized butadiene units have said formula and configuration.

4. The composition as claimed in claim 3, wherein the weight of the toughening agent amounts to 1 to 20 percent of the weight of the styrene polymer.

5. The composition comprising a major proportion of a styrene copolymer containing up to 35 percent of a copolymerizable non-vinyl aromatic monomer, said copolymer having a softening greater than 70°C, and, as a toughening agent, up to 20 percent of a copolymer of butadiene and styrene, containing from 50 to 95 percent of polymerized butadiene, from 30 to 95 percent of said polymerized butadiene units having the formula:

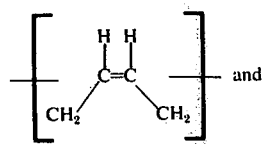

and in which the stereo configuration about the bond being cis, said toughening agent having been obtained by polymerization with an alkyl lithium catalyst, said composition containing the toughening agent in discrete particulate form, dispersed in a matrix of the styrene polymer.

6. A composition as claimed in claim 5, wherein the comonomer is acrylonitrile.

* * * * *

UNITED STATES PATENT OFFICE
CERTIFICATE OF CORRECTION

Patent No. 3,929,936     Dated December 30, 1975

Inventor(s) Thomas Ellis Davies et al.

It is certified that error appears in the above-identified patent and that said Letters Patent are hereby corrected as shown below:

After "abandoned" under Related U.S. Application Data, delete "said" and insert --and--. Also after "No. 651,660" insert --, July 7, 1967, abandoned--.

After above added "abandoned" delete "[30] Foreign Application Priority Data; Feb. 27, 1960; United Kingdom....6955/60".

Column 6, line 6, "follownig" should read "following".

Column 6, the second table, after "Elongation", insert --at break--

Column 7, line 8, insert --(9)-- after "Nine".

Column 8, the table under line 5, column headings after "Example" should read --B C D E--.

Same table, first number under corrected column heading "D" delete "O" and insert --9--.

Signed and Sealed this

Twenty-eighth Day of December 1976

[SEAL]

Attest:

RUTH C. MASON  
*Attesting Officer*

C. MARSHALL DANN  
*Commissioner of Patents and Trademarks*